US012551859B1

(12) United States Patent
Kim et al.

(10) Patent No.: US 12,551,859 B1
(45) Date of Patent: Feb. 17, 2026

(54) AEROGEL COMPOSITE

(71) Applicant: LG Chem, Ltd., Seoul (KR)

(72) Inventors: Mi Ri Kim, Seoul (KR); Yun Hye Hahm, Seoul (KR); Kyoungshil Oh, Seoul (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 19/192,745

(22) Filed: Apr. 29, 2025

(30) Foreign Application Priority Data

Jan. 13, 2025 (KR) ........................ 10-2025-0004967

(51) Int. Cl.
*B01J 13/00* (2006.01)
(52) U.S. Cl.
CPC ................................. *B01J 13/0091* (2013.01)
(58) Field of Classification Search
CPC .................................................... B01J 13/0091
See application file for complete search history.

(56) References Cited

U.S. PATENT DOCUMENTS

| | | | |
|---|---|---|---|
| 2,734,827 A | 2/1956 | Hooks | |
| 7,560,062 B2 | 7/2009 | Gould et al. | |
| 9,868,843 B2 * | 1/2018 | Evans | C08K 3/34 |
| 11,274,044 B2 | 3/2022 | Kim et al. | |
| 11,577,490 B2 | 2/2023 | Oikawa et al. | |
| 12,097,478 B2 | 9/2024 | Oh et al. | |
| 2002/0094426 A1 | 7/2002 | Stepanian et al. | |
| 2006/0125158 A1 | 6/2006 | Rouanet et al. | |
| 2010/0143717 A1 | 6/2010 | Sakamoto et al. | |
| 2016/0032584 A1 | 2/2016 | Doshi et al. | |
| 2016/0369059 A1 | 12/2016 | Kotake et al. | |
| 2017/0210092 A1 | 7/2017 | Rikleen et al. | |
| 2017/0283269 A1 | 10/2017 | Kotake et al. | |
| 2018/0009969 A1 | 1/2018 | Kim et al. | |
| 2018/0010726 A1 | 1/2018 | Kim et al. | |
| 2018/0029892 A1 | 2/2018 | Yu et al. | |
| 2018/0086587 A1 | 3/2018 | Kim et al. | |
| 2018/0134566 A1 | 5/2018 | Kim et al. | |
| 2018/0141821 A1 | 5/2018 | Hindelang et al. | |
| 2018/0244029 A1 | 8/2018 | Kim et al. | |
| 2018/0313001 A1 | 11/2018 | Dempsey | |
| 2018/0326700 A1 | 11/2018 | Kim | |
| 2019/0062167 A1 | 2/2019 | Kim et al. | |
| 2019/0374921 A1 | 12/2019 | Mihalcik et al. | |
| 2020/0108583 A1 | 4/2020 | Oikawa et al. | |
| 2020/0215791 A1 | 7/2020 | Oh et al. | |
| 2020/0378058 A1 | 12/2020 | Oikawa et al. | |
| 2021/0016239 A1 | 1/2021 | Kim et al. | |
| 2021/0155486 A1 | 5/2021 | Kang et al. | |
| 2021/0163303 A1 | 6/2021 | Evans et al. | |
| 2021/0309527 A1 | 10/2021 | Evans et al. | |
| 2021/0363699 A1 | 11/2021 | Afshari et al. | |
| 2021/0370636 A1 | 12/2021 | Tsuruta et al. | |
| 2022/0098046 A1 | 3/2022 | Lee et al. | |
| 2022/0195137 A1 | 6/2022 | Movahhed et al. | |
| 2022/0204350 A1 | 6/2022 | Oh et al. | |
| 2022/0250922 A1 * | 8/2022 | Jeon | C01B 33/159 |
| 2022/0380222 A1 | 12/2022 | Kim et al. | |
| 2023/0050685 A1 | 2/2023 | Kim et al. | |
| 2023/0212079 A1 | 7/2023 | Somberg et al. | |
| 2023/0331560 A1 | 10/2023 | Kim et al. | |
| 2023/0348285 A1 | 11/2023 | Numrich et al. | |
| 2025/0002410 A1 * | 1/2025 | Zafiropoulos | C04B 35/495 |

FOREIGN PATENT DOCUMENTS

| | | |
|---|---|---|
| CN | 101680128 B | 1/2013 |
| CN | 107140938 A | 9/2017 |
| CN | 106565268 B | 1/2020 |
| CN | 115748088 A | 3/2023 |
| CN | 116154360 A | 5/2023 |
| CN | 116945715 A | 10/2023 |
| CN | 113939942 B | 12/2024 |
| EP | 4056539 A1 | 9/2022 |
| JP | WO2017221687 A1 | 1/2019 |
| JP | WO2018163354 A1 | 12/2019 |
| JP | 2020060291 A | 4/2020 |
| JP | 2021036038 A | 3/2021 |
| JP | 2022529347 A | 6/2022 |
| JP | 7285085 B2 | 6/2023 |
| JP | 7352769 B2 | 9/2023 |
| JP | 7368327 B2 | 10/2023 |
| KR | 20050022986 A | 3/2005 |
| KR | 20070100738 A | 10/2007 |
| KR | 100909732 B1 | 7/2009 |
| KR | 20090078357 A | 7/2009 |
| KR | 100955622 B1 | 5/2010 |

(Continued)

OTHER PUBLICATIONS

Mihalcik et al. (RU2811474C2 English) (Year: 2024).*
He et al. (J. Haz. Mat. 2019, 362, 294-302) (Year: 2019).*
Liu et al. (Journal of Porous Materials, 1, 75-84, 1995) (Year: 1995).*
Emmerling, A. et al., "Small angle scattering and the structure of aerogels", Journal of Non-Crystalline Solids, Jan. 1992, pp. 113-120, vol. 145.
Dai, Yan-Jun et al., "A Theoretical Model for the Effective Thermal Conductivity of Silica Aerogel Composites", Elsevier, Applied Thermal Engineering, Jan. 2018, pp. 1634-1645 (29 pages), vol. 128.
Zhao, Jun-Jie et al., "A 3-D numerical heat transfer model for silica aerogels based on the porous secondary nanoparticle aggregate structure", Elsevier, Journal of Non-Crystalline Solids, Mar. 2012, pp. 1287-1297, vol. 358.

(Continued)

*Primary Examiner* — Michael B Cleveland
*Assistant Examiner* — Jordan W Taylor
(74) *Attorney, Agent, or Firm* — Lerner David LLP

(57) ABSTRACT

An aerogel composite may include a substrate and an aerogel, where a ratio of a carbon content in a surface of the aerogel composite to a total carbon content of the aerogel composite is from 2 to 3. The aerogel composite, when used in a high-temperature environment, may generate a low amount of a volatile organic compound (VOC), so that the generation of a bad odor is suppressed, and the hydrophobicity is high.

16 Claims, No Drawings

(56) References Cited

FOREIGN PATENT DOCUMENTS

| | | | |
|---|---|---|---|
| KR | 20120116944 A | 10/2012 |
| KR | 101281689 B1 | 7/2013 |
| KR | 20130138275 A | 12/2013 |
| KR | 20150090320 A | 8/2015 |
| KR | 20160100082 A | 8/2016 |
| KR | 101654795 B1 | 9/2016 |
| KR | 20160125956 A | 11/2016 |
| KR | 20170060027 A | 5/2017 |
| KR | 101748532 B1 | 6/2017 |
| KR | 101752091 B1 | 6/2017 |
| KR | 20170098141 A | 8/2017 |
| KR | 20170104914 A | 9/2017 |
| KR | 20170132829 A | 12/2017 |
| KR | 20180033064 A | 4/2018 |
| KR | 101911188 B1 | 10/2018 |
| KR | 101928538 B1 | 12/2018 |
| KR | 101966406 B1 | 4/2019 |
| KR | 101993643 B1 | 6/2019 |
| KR | 102023531 B1 | 9/2019 |
| KR | 20200073730 A | 6/2020 |
| KR | 20200095323 A | 8/2020 |
| KR | 102192354 B1 | 12/2020 |
| KR | 20210038232 A | 4/2021 |
| KR | 20210038374 A | 4/2021 |
| KR | 20210038375 A | 4/2021 |
| KR | 20210071508 A | 6/2021 |
| KR | 20210146798 A | 12/2021 |
| KR | 20210157353 A | 12/2021 |
| KR | 20220049841 A | 4/2022 |
| KR | 20220109454 A | 8/2022 |
| KR | 20220137360 A | 10/2022 |
| KR | 20220154727 A | 11/2022 |
| KR | 20220164499 A | 12/2022 |
| KR | 20230005300 A | 1/2023 |
| RU | 2811474 C2 * | 1/2024 |
| WO | 2008051029 A1 | 5/2008 |
| WO | 2017155311 A1 | 9/2017 |
| WO | 2022126279 A1 | 6/2022 |

OTHER PUBLICATIONS

Jeong, S. et al., "Application of Silica Aerogel as an Interlayer Insulating Film", The Korean Ceramic Society, Ceramist, Dec. 2001, pp. 84-90 (14 pages), vol. 4, Issue 6.

Shafi, S. et al., "Superhydrophobic, enhanced strength and thermal insulation silica aerogel/glass fiber felt based on methyltrimethoxysilane precursor and silica gel impregnation", Journal of Porous Materials, Apr. 2020, pp. 495-502, vol. 27.

Lakatos, A. et al., "Experimental verification of thermal properties of the aerogel blanket", Elsevier, Case Studies in Thermal Engineering, Mar. 2021, pp. 1-17, vol. 25.

Woignier, T. et al., "Mechanical Properties of Gel-Derived Materials", Kluwer Academic Publishers, Journal of Sol-Gel Science and Technology, Dec. 2000, pp. 163-169, vol. 19.

Klochkov, A. et al., "Pulse NMR of 3He in aerogel at temperature 1.5 K", IOP Publishing, Journal of Physics, Conference Series, Feb. 2009, 5 Pages, vol. 150.

International Search Report for Application No. PCT/KR2024/009125 mailed Oct. 27, 2024. 5 pages.

International Search Report for Application No. PCT/KR2024/013053 mailed Dec. 19, 2024. 4 pages.

International Search Report for Application No. PCT/KR2024/009126 mailed Oct. 18, 2024. 5 pages.

International Search Report for Application No. PCT/KR2024/015088 mailed Jan. 16, 2025. 3 pages.

International Search Report for Application No., PCT/KR2025/003925 dated Jun. 30, 2025. 5 pages.

International Search Report for Application No., PCT/KR2025/003927 dated Jun. 30, 2025. 5 pages.

International Search Report for Application No. PCT/KR2025/006641 mailed Aug. 29, 2025. 6 pages.

Ok, S. et al., "Fluid Behavior in Nanoporous Silica" Frontiers in Chemistry, Aug. 2020, pp. 1-20, vol. 8. Article 734.

* cited by examiner

AEROGEL COMPOSITE

CROSS-REFERENCE TO RELATED APPLICATION

This application claims priority to Korean Patent Application No. 10-2025-0004967 filed on Jan. 13, 2025, the content of which is incorporated by reference in its entirety.

TECHNICAL FIELD

The present disclosure relates to an aerogel composite and the use thereof as a heat insulation material.

BACKGROUND

Aerogel is a super-porous, high specific surface area ($\geq 500$ m$^2$/g) material having a porosity of approximately 90.0% to 99.9% and a pore size in the range of 1 nm to 100 nm, and is a material having excellent properties of ultralight weight/super-heat insulation/ultra-low dielectric, and the like. Accordingly, research on the development of aerogel materials as well as research on the application use thereof as transparent heat insulation materials and environmentally friendly high-temperature heat insulation materials, ultra-low dielectric thin films for highly integrated devices, catalysts and catalyst carriers, electrodes for supercapacitors, and electrode materials for seawater desalination have been actively conducted.

The biggest advantages of the aerogel are that the aerogel has super-insulation properties exhibiting a thermal conductivity of 0.300 W/m·K or less, which is lower than that of a conventional organic heat insulation material such as Styrofoam, and that fire vulnerability and generation of harmful gases in case of a fire, which are fatal weaknesses of the organic heat insulation material, can be solved.

An aerogel blanket in which aerogel is formed in a fiber is a functional heat insulation material, and is widely used in construction or industrial fields, and in addition, the hydrophobic silica aerogel blanket may be usefully used as a heat insulation material, thermal insulation material, or noncombustible material for aircraft, ships, automobiles, batteries, and the like.

Meanwhile, such an aerogel blanket is manufactured by preparing silica sol from a silica precursor such as water glass and an alkoxysilane group (TEOS, TMOS, MTMS, etc.), and then mixing a fiber with the sol, followed by performing gelation and drying on the mixture.

However, when the aerogel blanket thus manufactured is actually used, the aerogel absorbs moisture in the air, thereby causing a problem in which heat insulation performance is degraded. Therefore, in order to prevent the above-described problem, in the aerogel blanket manufacturing process, a surface modification process is added after the gelation and before the drying to hydrophobize the surface of silica aerogel. However, if a hydrophobic silica aerogel blanket is applied in a high-temperature environment, such as a high-temperature pipe, there is a problem in that a volatile organic compound (VOC) is generated, which causes a severe bad odor.

SUMMARY

The present disclosure provides an aerogel composite or a heat insulation member including the same, wherein even when the aerogel composite is used in a high-temperature environment, the generation amount of a volatile organic compound (VOC) may be reduced, so that the generation of a bad odor is suppressed, and at the same time, the hydrophobicity of the aerogel composite may still be maintained high.

However, the technical task to be achieved by the present disclosure is not limited to the aforementioned task, and other tasks that are not mentioned will be clearly understood by those skilled in the art from the following description.

In accordance with an aspect of the present disclosure, an aerogel composite includes a substrate, and aerogel including a plurality of open pores, wherein the aerogel composite includes carbon (C), silicon (Si), and oxygen (O), wherein the ratio of the carbon content on the surface of the aerogel composite to the total carbon content of the aerogel composite is 2 to 3, 2 to 2.9, or 2 to 2.85.

The total carbon content of the aerogel composite may mean the content (wt %) of carbon included in the total sum of carbon, silicon, and oxygen contents, which is set to 100 wt %, based on the total thickness of the aerogel composite.

The carbon content on the surface of the aerogel composite may mean the content (wt %) of carbon included in the total sum of carbon, silicon and oxygen contents, which is set to 100 wt %, in a region from the surface of the aerogel composite to a depth of about 10 nm.

When the total sum of carbon, silicon, and oxygen contents on the surface of the aerogel composite is set to 100 wt %, 20 wt % to 50 wt % of the silicon, 30 wt % to 60 wt % of the oxygen, and 5 wt % to 30 wt % of the carbon may be included, or 35 wt % to 45 wt % of the silicon, 40 wt % to 50 wt % of the oxygen, and 10 wt % to 20 wt % of the carbon may be included.

When the total sum of carbon, silicon, and oxygen contents is set to 100 wt % based on the total thickness of the aerogel composite, 20 wt % to 50 wt % of the silicon, 40 wt % to 75 wt % of the oxygen, and 1 wt % to 20 wt % of the carbon may be included, or 25 wt % to 45 wt % of the silicon, 50 wt % to 70 wt % of the oxygen, and 3 wt % to 10 wt % of the carbon may be included.

The ratio of the total carbon content to the total silicon content of the aerogel composite may be 0.05 to 0.30, or 0.05 to 0.25.

The ratio of the silicon content on the surface of the aerogel composite to the total silicon content of the aerogel composite may be 0.9 to 2.0, or 0.95 to 1.70.

The ratio of the oxygen content on the surface of the aerogel composite to the total oxygen content of the aerogel composite may be 0.5 to 1.0, or 0.6 to 0.9.

When the aerogel composite is heated at a temperature of 150° C. for 15 minutes, the amount of trimethylethoxysilane (TMES), trimethylsilanol (TMS), or hexamethyldisiloxane (HMDSO) generated per unit weight of the aerogel composite may be 10 µg/g or less.

The aerogel composite may have a moisture impregnation rate (wt %) of 15 wt % or less, or 11 wt % or less, which is represented by Equation 1 below.

$$\text{Moisture impregnation rate (wt \%)} = \{(\text{Weight of sample after impregnation} - \text{Weight of sample before impregnation})/(\text{Weight of sample before impregnation})\} \times 100 \quad [\text{Equation 1}]$$

In Equation 1 above, the weight of a sample after impregnation means the weight measured after impregnating an aerogel composite sample in distilled water at 21±2° C. for 15 minutes.

The aerogel composite may have a thickness of 0.5 mm to 20 mm, 0.5 mm to 15 mm, or 0.5 mm to 10 mm.

The aerogel composite may have a density of 0.05 g/cm³ to 0.50 g/cm³, 0.10 g/cm³ to 0.35 g/cm³, or 0.15 g/cm³ to 0.30 g/cm³.

The aerogel may be composed of silica, methylsilylated silica, dimethylsilylated silica, trimethylsilylated silica, or a mixture thereof.

An aerogel particle may include a particle in which a plurality of aerogel particles having a particle diameter of greater than 0 nm to 5 nm are aggregated or bonded.

In accordance with another aspect of the present disclosure, a heat insulation member includes the above-described aerogel composite.

The heat insulation member may further include a support member positioned on at least one surface of an upper surface of the aerogel composite or a lower surface thereof.

DETAILED DESCRIPTION

Hereinafter, aspects of the present disclosure will be described in more detail to facilitate understanding of the present disclosure. In this case, it will be understood that words or terms used in the specification and claims shall not be interpreted as having the meaning defined in commonly used dictionaries. It will be further understood that the words or terms should be interpreted as having a meaning that is consistent with their meaning in the context of the relevant art and the technical idea of the disclosure, based on the principle that an inventor may properly define the meaning of the words or terms to best explain the invention.

According to one aspect of the present disclosure, an aerogel composite includes a substrate, and aerogel including a plurality of open pores.

The "aerogel" includes a plurality of primary aerogel particles having a size of greater than approximately 0 nm to less than or equal to 10 nm, or greater than 0 nm to less than or equal to 5 nm, and a secondary aerogel particle formed by aggregation or combination of the above-described primary aerogel particles, and since a plurality of open pores are formed between the above-described primary aerogel particles and between the secondary aerogel particles to form an aggregate, the aerogel forms a three-dimensional network structure.

The "aerogel particles" are particles in the form of individual solid units constituting aerogel, and may include both primary aerogel particles having a size of greater than approximately 0 nm to less than or equal to 10 nm, or greater than 0 nm to 5 nm, or having a size of approximately 1 nm or less, and secondary aerogel particles formed by aggregation of the above-described particles. However, aerogel in an aerogel composite is mostly in the form of secondary aerogel particles or in the form in which the secondary aerogel particles are aggregated and combined, and there may be trace mixtures of primary aerogel particles that do not form secondary aerogel particles. The secondary aerogel particles may have an average particle diameter of approximately 5 nm to 2,000 nm, 5 nm to 1,000 nm, 5 nm to 500 nm, 5 nm to 100 nm, or 5 nm to 50 nm, but are not limited thereto. In the present disclosure, the above-described average particle size may be measured by any method known to those skilled in the art, such as scanning electron microscopy, dynamic light scattering, optical microscopy, or size exclusion, but the method is not limited thereto.

The aerogel may have a matrix skeletal structure including mesopores, and may include micropores or macropores in addition to the mesopores. Here, the "mesopore" is a pore having an average pore diameter in the range of approximately 2 nm to approximately 50 nm, the "macropore" is a pore having an average pore diameter in the range of greater than approximately 50 nm, and the "micropore" is a pore having an average pore diameter in the range of less than approximately 2 nm. The aerogel may include mesopores of at least 50%, at least 60%, at least 70%, at least 80%, at least 90%, at least 95%, at least 96%, at least 97%, at least 98%, at least 99%, or 100% of the pore volume of the skeletal structure. For example, the aerogel of the present disclosure may include mesopores. For example, the aerogel of the present disclosure may include mesopores and micropores. The pore size may be measured by any means known to those skilled in the art, such as a gas adsorption experiment, mercury infiltration, capillary flow porometry, positron annihilation lifetime spectroscopy (PALS), or the like, but is not limited thereto.

Examples of the above substrate may be discrete fibers, a film, a sheet, a net, a fiber, a porous body, a foam, a non-woven body, or a laminate of two or more layers thereof. In addition, depending on the application thereof, the substrate may have surface roughness formed or patterned on the surface thereof. As an example, the substrate may be a fiber substrate comprising a plurality of fibers.

The substrate may be polyester, polyolefin terephthalate, poly(ethylene) naphthalate, polycarbonate (e.g., rayon, nylon), cotton (e.g., Lycra® manufactured by DuPont), carbon (e.g., graphite), polyacrylonitrile (PAN), oxidized PAN, non-carbonized heat-treated PAN (such as those made of SGL carbon), a glass fiber-based material (S-glass, 901 glass, 902 glass, 475 glass, E-glass, etc.), a silica-based fiber such as Quartz (e.g., Quartzel® manufactured by Saint-Gobain), Q-Fiber® felt (manufactured by Jones Manville), Saffil (manufactured by Saffil), Durablanket (manufactured by Unifrax) or other silica fibers, Duraback® (manufactured by Carborundum), a polyaramid fiber such as Kevlar®, Nomex®, or Sontera® (all manufactured by DuPont), CONEX (manufactured by Taijin), a polyolefin such as Tyvek® (manufactured by DuPont), Dyneema (manufactured by DSM), Spectra® (manufactured by Honeywell), other polypropylene fibers such as Typar® and Xavan® (both manufactured by DuPont), a fluoropolymer such as PTFE under the trade name Teflon® (manufactured by DuPont), Goretex® (manufactured by W.L. GORE), a silicon carbide fiber such as NICALCON (manufactured by COI Ceramics), a ceramic fiber such as NEXTEL (manufactured by 3M), a ceramic paper, an acrylic polymer, a basalt fiber, wool, silk, hemp, leather, a suede fiber, a PBO fiber Zylong® (manufactured by Toyobo), a liquid crystal material such as VECTAN (manufactured by Hoechst), a cambrel fiber (manufactured by DuPont), polyurethane, polyamide, a wool fiber, boron, aluminum, iron, a stainless steel fiber or other thermoplastic resins such as PEEK, PES, PET, PEK, PPS, and the like, but any fiber may be used without limitation as long as it is a fiber which includes spaces or voids into which an aerogel may be easily inserted, thereby improving heat insulation performance. As an example, the substrate may comprise a glass fiber, a basalt fiber, or a ceramic paper, but is not limited thereto. As an example, the substrate may be a glass fiber, but is not limited thereto.

When using a substrate that includes fibers as the substrate, the aerogel composite has a structure in which at least some of a plurality of aerogel particles are dispersed, or combined, on the surface of a substrate including a fiber, and at the same time, has a structure in which at least some of the plurality of aerogel particles are dispersed, or positioned, in an empty space between discrete fibers in the substrate.

In general, in preparing an aerogel composite, hydrophobicity is imparted to the aerogel composite through a surface modification process in order to prevent the degradation in heat insulation performance due to moisture penetration when the aerogel composite is applied as a heat insulation material. However, if the hydrophobic aerogel composite is exposed to a high-temperature environment in actual use, a volatile organic compound (VOC) is generated in a large amount, thereby causing inconvenience to a user or operator due to a bad odor. The degree of hydrophobicity is lowered on the surface of a surface-modified aerogel composite, but the degree of hydrophobicity is maintained high inside aerogel pores, so that it is possible to reduce the generation amount of a volatile organic compound (VOC), and also prevent the degradation in heat insulation performance due to moisture.

In addition, the aerogel may be inorganic silica aerogel formed from a silicon alkoxide-based compound or water glass as a precursor. As an example, the aerogel may be composed of silica, methylsilylated silica, dimethylsilylated silica, trimethylsilylated silica, or a mixture thereof. As another example, the aerogel may be that at least a portion of $SiO_2$ present on the surface of a $SiO_2$ network structure has a bonding structure of Si—O—$SiO_2(CH_3)$, Si—O—SiO $(CH_3)_2$, or Si—O—$Si(CH_3)_3$. A specific process for preparing silica aerogel will be described in detail below.

Therefore, the aerogel composite includes silicon (Si), oxygen (O), and carbon (C) as essential elements.

When the total sum of silicon, oxygen, and carbon contents in the aerogel composite is set to 100 wt %, the silicon may be included in an amount of 20 wt % to 50 wt %, 20 wt % to 45 wt %, 25 wt % to 50 wt %, or 25 to 45 wt %.

In addition, when the total sum of silicon, oxygen, and carbon contents in the aerogel composite is set to 100 wt %, the oxygen may be included in an amount of 40 wt % to 75 wt %, 40 wt % to 70 wt %, 45 wt % to 75 wt %, 45 wt % to 70 wt %, 50 wt % to 75 wt %, or 50 wt % to 70 wt %.

In addition, when the total sum of silicon, oxygen, and carbon contents in the aerogel composite is set to 100 wt %, the carbon may be included in an amount of 1 wt % to 20 wt %, 1 wt % to 15 wt %, 1 wt % to 10 wt %, 2 wt % to 20 wt %, 2 wt % to 15 wt %, 2 wt % to 10 wt %, 3 wt % to 20 wt %, 3 wt % to 15 wt %, or 3 w to 10 wt %.

In addition, when the total sum of silicon, oxygen, and carbon contents in the aerogel composite is set to 100 wt %, the ratio of the carbon content to the silicon content may be 0.05 or to 0.30, 0.05 to 0.25, 0.05 to 0.23, 0.08 to 0.30, 0.08 to 0.25, or 0.08 to 0.23.

The aerogel composite is characterized in that the ratio of the carbon content on the surface of the aerogel composite to the total carbon content is 2 to 3. Specifically, the ratio of the carbon content on the surface of the aerogel composite to the total carbon content may be 2 to 2.9, or 2 to 2.85.

In the present disclosure, the aerogel composite in which the ratio of the carbon content on the surface to the total carbon content satisfies the above-described ranges has a very low level of trimethylethoxysilane (TMES), trimethylsilanol (TMS), or hexamethyldisiloxane (HMDSO) generation even in a high-temperature environment of 150° C. or higher, and also, has excellent hydrophobicity of the aerogel composite. However, if the ratio of the carbon content on the surface to the total carbon content is less than the above-described ranges, the hydrophobicity of the aerogel composite is too low to cause performance degradation due to moisture. On the other hand, if the ratio of the carbon content on the surface to the total carbon content is greater than the above-described ranges, the generation amounts of volatile organic compounds (VOC) such as the above-described TMES, TMS, and HMDSO may be increased in a high-temperature environment, thereby causing a problem of a bad odor.

In the present specification, the "total carbon content of the aerogel composite" is obtained through XRF analysis, and refers to the ratio (wt %) of the carbon content in the total sum of carbon, silicon, and oxygen contents, which is set to 100 wt %, based on the total thickness of the aerogel composite.

In the present specification, the "ratio of the carbon content on the surface of the aerogel composite" is obtained through XPS analysis, and refers to the ratio (wt %) of the carbon content included in the total sum of carbon, silicon and oxygen contents, which is set to 100 wt %, in a region from the surface of the aerogel composite to a depth of about 10 nm.

When the total sum of silicon, oxygen, and carbon contents on the surface of the aerogel composite is set to 100 wt %, the silicon may be included in an amount of 20 wt % to 50 wt %, 20 wt % to 45 wt %, 25 wt % to 50 wt %, 25 wt % to 45 wt %, 30 wt % to 50 wt %, 30 wt % to 45 wt %, 35 wt % to 50 wt %, or 35 wt % to 45 wt %.

When the total sum of silicon, oxygen, and carbon contents on the surface of the aerogel composite is set to 100 wt %, the oxygen may be included in an amount of 30 wt % to 60 wt %, 30 wt % to 55 wt %, 30 wt % to 50 wt %, 35 wt % to 60 wt %, 35 wt % to 55 wt %, 35 wt % to 50 wt %, 40 wt % to 60 wt %, 40 wt % to 55 wt %, or 40 wt % to 50 wt %.

When the total sum of silicon, oxygen, and carbon contents on the surface of the aerogel composite is set to 100 wt %, the carbon may be included in an amount of 5 wt % to 30 wt %, 5 wt % to 25 wt %, 5 wt % to 20 wt %, 7 wt % to 30 wt %, 7 wt % to 25 wt %, 7 wt % to 20 wt %, 10 wt % to 30 wt %, 10 wt % to 25 wt %, or 10 wt % to 20 wt %.

In addition, when the total sum of silicon, oxygen, and carbon contents on the surface of the aerogel composite is set to 100 wt %, the ratio of the carbon content to the silicon content may be 0.20 to 0.60, 0.20 to 0.55, 0.20 to 0.50, 0.25 to 0.60, 0.25 to 0.55, or 0.25 to 0.50.

The aerogel composite is characterized in that the ratio of the silicon content on the surface of the aerogel composite to the total silicon content is 0.9 to 2.0, 0.9 to 1.8, or 0.95 to 1.70.

In addition, the aerogel composite is characterized in that the ratio of the oxygen content on the surface of the aerogel composite to the total oxygen content is 0.5 to 1.0, 0.5 to 0.9, 0.6 to 1.0 or 0.6 to 0.9.

The analysis of silicon, oxygen, and carbon contents based on the total thickness of the aerogel composite was performed using an X-ray fluorescence (XRF) component analyzer. The XRF analysis is performed by irradiating a sample with an X-ray, and then analyzing the sample using a fluorescence X-ray generated from the sample. If a high voltage-current is applied to an X-ray tube, an X-ray is emitted, and if a sample is irradiated with the emitted X-ray, electrons in an orbit of an element present in the sample are excited, and as electrons in the excited state return to the ground state, a characteristic fluorescence X-ray is emitted according to each element. At this time, if the emitted fluorescence X-ray is diffracted by an analyzing crystal, an analysis result may be obtained using a detector. In the present disclosure, the content of each component at the time of the XRF analysis is obtained by obtaining five circular samples having a diameter of approximately 30 mm from the aerogel composite, and then calculating an average value of silicon, oxygen, and carbon contents (wt %) measured from each sample. At this time, the five samples may be obtained by obtaining four samples by positioning a position, which is spaced apart by 10 cm in a center direction from each corner of the aerogel composite prepared in a rectangular shape (e.g., which may have a size of 60 cm×12 cm, but is not limited thereto), at the center of each sample, and obtaining one sample by positioning the exact central portion of the aerogel composite at the center of the sample as well.

In addition, the analysis of silicon, oxygen, and carbon contents in a region from an externally exposed surface of the aerogel composite to a depth of approximately 10 nm was performed using an X-ray photoelectron spectroscopy (XPS) component analyzer. At this time, the content of each component is obtained in atomic (at) %, which is converted into weight % in the present specification. In the present disclosure, the content of each component at the time of the XPS analysis is obtained by obtaining five quadrangular samples measuring 10 mm×10 mm in width×height and having a thickness corresponding to the thickness of the aerogel composite, and then calculating an average value of silicon, oxygen, and carbon contents (wt %) measured from each sample. At this time, a method for obtaining the five samples may be performed in the same manner as in the XRF analysis method.

When the aerogel composite is heated at a temperature of 150° C. for 15 minutes, the amount of trimethylethoxysilane (TMES), trimethylsilanol (TMS), or hexamethyldisiloxane (HMDSO) generated per unit weight of the aerogel composite is 10 μg/g or less, or less than 10 μg/g, which is very low.

The aerogel composite may have a moisture impregnation rate (wt %) of 15 wt % or less, 11 wt % or less, 10 wt % or less, 9 wt % or less, 8 wt % or less, or 7 wt % or less, which is represented by Equation 1 below.

Moisture impregnation rate (wt %)={(Weight of sample after impregnation−Weight of sample before impregnation)/(Weight of sample before impregnation)}×100     [Equation 1]

In Equation 1 above, the moisture impregnation rate may be calculated by floating a sample of 10 mm×10 mm in size of the aerogel composite on distilled water at 21±2° C., and then placing a 6.4 mm mesh screen on top of the sample to impregnate the sample by sinking the same to 127 mm below the surface of the water, and after 15 minutes, removing the mesh screen and when the sample rises to the surface, picking the sample up with a clamp and hanging the sample vertically for 60±5 seconds, and then measuring the weight increase rate by measuring the weight before and after the impregnation, respectively. Here, the lower the moisture impregnation rate, the higher the degree of hydrophobicity of the aerogel composite.

In addition, when measuring the moisture impregnation rate, a moisture impregnation rate measured using an aerogel composite sample cut to a size of 10 mm×10 mm, is intended to represent water repellency on the cross-section of the aerogel composite.

The moisture impregnation rate may also be obtained by calculating an average value of moisture impregnation rates measured for five samples. At this time, a method for obtaining five samples is the same as in the X-ray fluorescence (XRF) analysis and the X-ray photoelectron spectroscopy (XPS) analysis described above.

Meanwhile, in the aerogel composite, the thickness of the substrate is not particularly limited, and may be appropriately selected according to an application use, but may be, for example, 0.5 mm to 20 mm, 0.5 mm to 15 mm, 0.5 mm to 10 mm, 0.5 mm to 9 mm, 0.5 mm to 8 mm, 0.5 mm to 7 mm, 0.5 mm to 6 mm, 0.5 mm to 5 mm, 0.5 mm to 4 mm, 0.5 mm to 3 mm, 0.5 mm to 2 mm, 0.5 mm to 1 mm, 1 mm to 20 mm, 1 mm to 15 mm, 1 mm to 10 mm, 1 mm to 9 mm, 1 mm to 8 mm, 1 mm to 7 mm, 1 mm to 6 mm, 1 mm to 5 mm, 1 mm to 4 mm, 1 mm to 3 mm, or 1 mm to 2 mm. However, the aspects of the present disclosure are not limited thereto.

In addition, the thickness of the aerogel composite is not particularly limited, and may be appropriately selected according to an application use, but may be, for example, 0.5 mm to 20 mm, 0.5 mm to 15 mm, 0.5 mm to 10 mm, 0.5 mm to 9 mm, 0.5 mm to 8 mm, 0.5 mm to 7 mm, 0.5 mm to 6 mm, 0.5 mm to 5 mm, 0.5 mm to 4 mm, 0.5 mm to 3 mm, 0.5 mm to 2 mm, 0.5 mm to 1 mm, 1 mm to 20 mm, 1 mm to 15 mm, 1 mm to 10 mm, 1 mm to 9 mm, 1 mm to 8 mm, 1 mm to 7 mm, 1 mm to 6 mm, 1 mm to 5 mm, 1 mm to 4 mm, 1 mm to 3 mm, or 1 mm to 2 mm, but is not limited thereto.

In addition, the density of the aerogel composite may be 0.05 g/cm$^3$ to 0.50 g/cm$^3$, 0.05 g/cm$^3$ to 0.35 g/cm$^3$, 0.05 g/cm$^3$ to 0.30 g/cm$^3$, 0.10 g/cm$^3$ to 0.35 g/cm$^3$, 0.10 g/cm$^3$ to 0.30 g/cm$^3$, 0.15 g/cm$^3$ to 0.35 g/cm$^3$, or 0.15 g/cm$^3$ to 0.30 g/cm$^3$, but is not limited thereto.

In addition, the aerogel composite may have a thermal conductivity at room temperature (23±2° C.) of 30.0 mW/mK or less, 25.0 mW/mK or less, or 20.0 mW/mK or less, and when in the above-described ranges, there is an effect of maximally securing heat insulation properties of the aerogel composite.

The aerogel composite may have a thermal conductivity at a high temperature (150° C.) of 35.0 mW/mK or less, 30.0 mW/mK or less, or 25.0 mW/mK or less, and in the above-described ranges, there is an effect of maximally securing heat insulation properties of the aerogel composite.

The aerogel composite has a compressive strength of 20 kPa to 80 kPa, 20 kPa to 70 kPa, 30 kPa to 80 kPa, 30 kPa to 70 kPa, 35 kPa to 80 kPa, or 35 kPa to 70 kPa at 10% deformation, and may have excellent mechanical strength. Here, the compressive strength may be measured by preparing a sample according to the ASTM C165 specifications.

The aerogel composite has a tensile strength of 30 N/cm$^2$ to 60 N/cm$^2$, 40 N/cm$^2$ to 55 N/cm$^2$, or 45 N/cm$^2$ to 55 N/cm$^2$, and may have excellent flexibility. Here, the tensile strength may be measured by preparing a sample according to the ASTM D638 specifications.

In the present disclosure, the aerogel composite may be formed by the steps of preparing a silica sol, impregnating a fiber substrate with the silica sol, followed by preforming gelation, aging, surface modification, and drying. Hereinafter, each step will be described. However, the specific preparation processes or examples thereof described herein are not intended to be limited to any particular type of aerogel or preparation method thereof. The present specification may include any aerogel formed by any associated preparation method known to those skilled in the art.

Preparation of Silica Sol

In the present disclosure, a silica precursor composition and a catalyst composition may be mixed to prepare a silica sol.

The silica precursor composition may include water and/or a polar organic solvent in a silica precursor.

The silica precursor may be used without limitation as long as it is a precursor which may be used to form a silica aerogel, and for example, may be a silicon-containing alkoxide-based compound. Specifically, the silica precursor may be tetra alkyl silicate such as tetramethyl orthosilicate (TMOS), tetraethyl orthosilicate (TEOS), methyl triethyl orthosilicate, dimethyl diethyl orthosilicate, tetrapropyl orthosilicate, tetraisopropyl orthosilicate, tetrabutyl orthosilicate, tetra secondary butyl orthosilicate, tetra tertiary butyl orthosilicate, tetrahexyl orthosilicate, tetracyclohexyl orthosilicate, and tetradodecyl orthosilicate. Among these, more specifically, in the case of the present disclosure, the silica precursor may be tetramethyl orthosilicate (TMOS), tetraethyl orthosilicate (TEOS), or a mixture thereof.

In addition, the silica precursor may be a water glass solution. Here, the water glass solution may be a diluted solution in which distilled water is added to water glass and then mixed therewith, and the water glass may be sodium silicate ($Na_2SiO_3$) which is an alkali silicate salt obtained by melting silicon dioxide ($SiO_2$) and alkali.

In addition, the silica precursor may include a pre-hydrolyzed TEOS (HTEOS). The HTEOS is an ethyl silicate oligomer material having a wide molecular weight distribution, and when synthesized into an oligomer form from a TEOS monomer, physical properties such as gelation time may be adjusted, and thus, may be easily applied according to a user's reaction conditions. In addition, there is an advantage in that reproducible physical properties of a final product may be created. The HTEOS may typically be synthesized by a condensation reaction of TEOS which has undergone a partial hydration step under acidic conditions. That is, the HTEOS is in the form of an oligomer prepared by condensing TEOS, wherein the oligomer is partially hydrated.

The silica precursor composition may further include a silicate containing a hydrophobic group, thereby imparting elasticity to an aerogel structure to increase pore strength, and hydrophobization may also be induced inside an aerogel matrix. In the present disclosure, the silicate containing a hydrophobic group is not limited as long as it is an alkyl silane compound including an alkyl group inducing hydrophobization and a silane functional group capable of reacting with a —Si—O— functional group of a wet gel. Non-limiting examples thereof may be one or more selected from the group consisting of methyltriethoxysilane (MTES), trimethylethoxysilane (TMES), trimethylsilanol (TMS), methyltrimethoxysilane (MTMS), dimethyldiethoxysilane (DMDEOS), ethyltriethoxysilane (ETES), and phenyltriethoxysilane (PTES). As an example, the alkyl silane compound may be methyltriethoxysilane (MTES), but is not limited thereto.

If the silicate including a hydrophobic group is included in the silica precursor composition, the silicate including a hydrophobic group and the aforementioned tetraalkyl silicate may be included at a molar ratio (molar ratio of silicate including a hydrophobic group:tetraalkyl silicate) of 2:98 to 98:2, or at a molar ratio of 5:95 to 40:60. In the above-described ranges, it is possible to secure the heat insulation performance and hydrophobicity of aerogel at a high efficiency at the same time.

The silica concentration of the silica precursor composition may be 10 $kg/m^3$ to 100 $kg/m^3$, 20 $kg/m^3$ to 80 $kg/m^3$, 30 $kg/m^3$ to 70 $kg/m^3$, 30 $kg/m^3$ to 60 $kg/m^3$, or 35 $kg/m^3$ to 45 $kg/m^3$, but is not limited thereto. The silica concentration is the concentration of the silica included in the silica precursor with respect to the silica precursor composition, and may be suitably adjusted by varying the contents of a silica precursor, an organic solvent, and water.

The silica precursor may be used in an amount such that the content of the silica included in the silica sol is to be 0.1 wt % to 30 wt %, but is not limited thereto. If the content of the silica satisfies the above range, the mechanical physical properties, flexibility in particular, of the aerogel composite may be at an excellent level while having an improved heat insulation effect.

The polar organic solvent may include an alcohol, and specific examples thereof may include a monohydric alcohol such as methanol, ethanol, isopropanol, and butanol, a polyhydric alcohol such as glycerol, ethylene glycol, propylene glycol, diethylene glycol, dipropylene glycol, and sorbitol, or a combination thereof, but other solvents as known to those skilled in the art may also be used without limitation. When considering the miscibility with water and aerogel, the polar organic solvent may be a monohydric alcohol having 1 to 6 carbon atoms such as methanol, ethanol, isopropanol, and butanol, and may be, for example, ethanol.

The polar organic solvent may be used in an appropriate amount by those skilled in the art in consideration of the degree of hydrophobicity in an aerogel composite to be finally prepared while promoting a surface modification reaction.

When preparing the silica precursor composition, the silica precursor and the organic solvent may be mixed at a weight ratio of 1:0.1 to 5, or 1:0.5 to 3 to prepare the composition, the present disclosure is not limited thereto. However, if the silicate containing a hydrophobic group is included in the silica precursor composition, a mixture of the silicate containing a hydrophobic group and a tetraalkyl silicate and an organic solvent may be mixed in the above weight ratio.

In addition, when preparing the silica precursor composition, the silica precursor and water may be mixed and in a molar ratio of 1:0.5 to 10, 1:1 to 8, or 1:3 to 6 to prepare the composition, but the present disclosure is not limited thereto. However, if the silicate containing a hydrophobic group is included in the silica precursor composition, a mixture of the silicate containing a hydrophobic group and a tetraalkyl silicate and water may be mixed in the above molar ratio.

The silica precursor composition may further include an acid catalyst, and specifically, may further include an acid catalyst when applying an alkoxy silane-based compound, which is not a hydrolysate, as a precursor. At this time, the acid catalyst may be used without limitation as long as it is an acid catalyst which allows the pH to be 3 or less, and as an example, a hydrochloric acid, a nitric acid, a sulfuric acid, a phosphoric acid, an oxalic acid, or an acetic acid may be used. At this time, the acid catalyst may be added in an amount which allows the pH of the sol to be 3 or less, and may be added in the form of an aqueous solution in which the acid catalyst is dissolved in an aqueous solvent.

The catalyst composition may include, as a base catalyst, an inorganic base such as sodium hydroxide or potassium hydroxide, or an organic base such as ammonium hydroxide. Specific examples thereof may include sodium hydroxide (NaOH), potassium hydroxide (KOH), calcium hydroxide ($Ca(OH)_2$), ammonia ($NH_3$), ammonium hydroxide ($NH_4OH$; ammonia water), tetramethylammonium hydroxide (TMAH), tetraethylammonium hydroxide (TEAH), tetrapropylammonium hydroxide (TPAH), tetrabutylammonium hydroxide (TBAH), methylamine, ethylamine, isopropylamine, monoisopropylamine, diethylamine, diisopropylamine, dibutylamine, trimethylamine, triethylamine, triisopropylamine, tributylamine, choline, monoethanolamine, diethanolamine, 2-aminoethanol, 2-(ethyl amino) ethanol, 2-(methyl amino) ethanol, N-methyl diethanolamine, dimethylaminoethanol, diethylaminoethanol, nitrilotriethanol, 2-(2-aminoethoxy) ethanol, 1-amino-2-propanol, triethanolamine, monopropanolamine, dibutanolamine, pyridine, a combination thereof, or the like, but are not limited thereto.

The base catalyst may be included in an amount such that the pH of the sol is to be 5 to 9. If the pH of the sol is out of the above range, gelation may not be easily achieved or a gelation rate may be too low, so that processability may be degraded. In addition, since the base may be precipitated when introduced in a solid phase, the base may be added in a solution phase diluted by an aqueous solvent or the above-described organic solvent. At this time, the dilution ratio of the base catalyst and the organic solvent, specifically an alcohol, may be 1:4 to 1:100 based on a volume basis, but is not limited thereto.

In order to prepare the silica sol, the silica precursor composition and the catalyst composition may be mixed at a volume ratio of 1:0.01 to 10.0, 1:0.01 to 5.0, or 1:0.01 to 2.0, but is not limited thereto.

If necessary, an additive may be further added to the silica sol. At this time, all known additives which may be added when preparing aerogel may be applied as the additive, and for example, an additive such as an opacifying agent and a flame retardant may be used.

The additive may be added in an amount of 0.1 wt % to 10 wt %, 0.1 wt % to 7 wt %, 0.5 wt % to 7 wt %, or 0.5 wt % to 5 wt % based on the silica content of the aerogel, but is not limited thereto.

Gelation of Silica Sol

In the present disclosure, after the silica sol is impregnated into the substrate, the silica sol may be subjected to gelation.

The impregnation process is a process of allowing a catalyzed silica sol to permeate into pores inside the substrate, and may be performed by introducing the catalyzed silica sol and the substrate into a reaction vessel, or may be performed by spraying the catalyzed silica sol on the substrate which is moving on a conveyor belt according to a roll-to-roll process. At this time, in order to improve the bonding between the substrate and the silica sol, the substrate may be lightly pressed down to be sufficiently impregnated. Thereafter, the substrate may be pressed to a predetermined thickness with a predetermined pressure to remove excess silica sol, so that drying time may be reduced.

The temperature of the silica sol in the reaction vessel may be 1° C. to 40° C., 20° C. to 40° C., 25° C. to 40° C., 30° C. to 40° C., or 35° C. to 45° C. When the temperature of the silica sol in the reaction vessel satisfies the above range, the above-described viscosity range of the catalyzed sol may be more easily achieved, and even the retention time is relatively short, a desired level of viscosity range may be achieved.

The catalyzed silica sol may be impregnated into the substrate at a volume ratio of 0.1 to 10:1 (catalyzed silica sol:substrate), a volume ratio of 0.1 to 1:1, a volume ratio of 0.3 to 1:1, a volume ratio of 0.5 to 1:1, or a volume ratio of 0.6 to 1:1, which can enhance hydrophobicity and increase matrix strength, but is not limited thereto.

The silica sol impregnated into the substrate may be subjected to gelation simultaneously with the impregnation process of the silica sol or sequentially after the impregnation process.

The substrate impregnated with the catalyzed sol may be subjected to gelation on a moving element such as a conveyor belt.

In the present disclosure, the "gelation" may refer to a sol-gel reaction, and the "sol-gel reaction" may be forming a network structure from a silicon unit precursor material. Here, the network structure may be a planar mesh structure in which specific polygons having one or more types of atomic arrangement are linked to each other, or a structure in which specific polyhedrons share their vertices, edges, faces, and the like with each other to form a three-dimensional skeletal structure.

The gelation may be performed under an atmosphere temperature of 20° C. to 40° C., 20° C. to 30° C., 25° C. to 40° C., 30° C. to 40° C., or 35° C. to 40° C., but is not limited thereto.

The gelation may be performed for about 1 minute to 120 minutes, 1 minute to 100 minutes, 1 minute to 60 minutes, 5 minutes to 60 minutes, 5 minutes to 40 minutes, 10 minutes to 40 minutes, 10 minutes to 30 minutes, or 10 minutes to 20 minutes, but may be suitably adjusted in consideration the gelation temperature, the amount of silica sol, and the like.

Aging of Wet Gel Composite which has Gelled

In the present disclosure, if necessary, an aging step may be further included, which is leaving the wet gel composite obtained by gelation as described above to stand at an appropriate temperature so as to achieve a complete chemical change. In the aging step, the network structure formed by the gelation may be more firmly formed, so that the mechanical stability of the aerogel composite may be improved.

The aging step may be performed by leaving the wet gel composite which has gelled to stand as it is at an appropriate temperature, or may be performed by adding a cross-linking-promoting compound.

The aging step may be performed by adding a solution in which a base catalyst such as sodium hydroxide (NaOH), potassium hydroxide (KOH), ammonium hydroxide (NH$_4$OH), triethylamine, pyridine, or the like is diluted to a concentration of 1 wt % to 10 wt % in an organic solvent, in the presence of the wet gel composite. In this case, a Si—O—Si bonding in aerogel is induced to the maximum to allow the network structure of a silica gel to be firmer, so that there is an effect of facilitating the maintenance of the pore structure in a drying process be performed later. At this time, the organic solvent may be the alcohol described above, and specifically, may include ethanol.

In addition, in the aging step, a mixed solution of an alkoxy silane-based compound and an alcohol may be added to provide an additional sol precursor source as well as unreacted sol to induce additional gelation in the silica gel network structure, thereby further strengthening the gel structure. If the silicate containing a hydrophobic group is added as the alkoxy silane-based compound, the strengthening of the aerogel matrix structure and hydrophobic modification of the aerogel matrix surface/interior may be simultaneously performed. The alkoxy silane-based compound may be included in an amount of 0.5 parts by weight to 9.5 parts by weight, 1.0 part by weight to 7 parts by weight, or 1.5 parts by weight to 5 parts by weight based on the total 100 parts of the aging solution.

The alkoxy silane-based compound may include one or more selected from the group consisting of tetramethyl orthosilicate (TMOS), tetraethyl orthosilicate (TEOS), methyl triethyl orthosilicate, dimethyl diethyl orthosilicate, tetrapropyl orthosilicate, tetraisopropyl orthosilicate, tetrabutyl orthosilicate, tetra secondary butyl orthosilicate, tetra tertiary butyl orthosilicate, tetrahexyl orthosilicate, tetracyclohexyl orthosilicate, tetradodecyl orthosilicate, methyltrimethoxysilane (MTMS), methyltriethoxysilane (MTES), trimethylethoxysilane (TMES), trimethylsilanol (TMS), trimethylchlorosilane (TMCS), ethyltriethoxysilane (ETES), dimethyldiethoxysilane (DMDEOS), and phenyltriethoxysilane.

In addition, the alcohol may specifically be a monohydric alcohol such as methanol, ethanol, isopropanol, and butanol, or a polyhydric alcohol such as glycerol, ethylene glycol, propylene glycol, diethylene glycol, dipropylene glycol, and sorbitol, for example a monohydric alcohol having 1 to 6 carbon atoms such as methanol, ethanol, isopropanol, and butanol, and may be, for example, ethanol, but is not limited thereto.

The aging step may be performed by leaving the wet gel composite which has gelled to stand at a temperature of 30° C. to 80° C., 40° C. to 80° C., or 50° C. to 80° C. for 0.1 hours to 20 hours, 0.5 hours to 15 hours, 0.5 hours to 10 hours, 0.5 hours to 7 hours, or 0.5 hour to 5 hours to strengthen the pore structure, and within this range, it is possible to prevent an increase in production costs by preventing a loss of the solvent due to evaporation while preventing a decrease in productivity.

In addition, the aging step may be performed by performing primary aging of leaving the wet gel composite which has gelled at 30° C. to 80° C. for 0.1 hours to 5 hours to strengthen the pore structure, and then performing secondary aging at 30° C. to 80° C. for 0.1 hours to 20 hours, 0.5 hours to 15 hours, 0.5 hours to 10 hours, 0.5 hours to 7 hours, or 1 hour to 5 hours, by adding a solution in which the above-described basic catalyst is diluted in an organic solvent.

In addition, in order to strengthen the pore structure as well as to hydrophobize the inside of the pores, the aging step may be performed by performing primary aging under the conditions described above, and then performing secondary aging at 30° C. to 80° C. for 0.1 hours to 20 hours, 0.5 hours to 15 hours, 0.5 hours to 10 hours, 0.5 hours to 7 hours, or 1 hour to 5 hours by adding a mixed solution of an alkoxy silane-based compound and an alcohol.

The aging step may be performed in a separate reaction vessel after recovering the wet gel composite which has gelled, or may be performed inside the reaction vessel in which the gelation step has been performed.

Surface Modification of Aged Wet Gel Composite

In the present disclosure, if necessary, a surface modification step of hydrophobizing the surface of the wet gel composite obtained by the gelation as described above or the surface of the aged wet gel composite may be further included in the presence of a surface modifier.

As the surface modifier, a compound which hydrophobizes the surface of a wet gel may be applied without limitation, which may be, for example, a silane-based compound, a siloxane-based compound, a silanol-based compound, a silazane-based compound, or a combination thereof. Specific examples thereof may be a silane-based compound such as trimethylchlorosilane (TMCS), dimethyldimethoxysilane, dimethyldiethoxysilane, methyltrimethoxysilane (MTMS), methyltriethoxysilane (MTES), trimethylethoxysilane (TMES), vinyltrimethoxysilane, ethyltriethoxysilane, phenyltriethoxysilane, phenyltrimethoxysilane, tetraethoxysilane, dimethyldichlorosilane, and 3-aminopropyltriethoxysilane, a siloxane-based compound such as polydimethyl siloxane, polydiethyl siloxane, and octamethyl cyclotetra siloxane, a silanol-based compound such as trimethylsilanol, triethylsilanol, triphenyl silanol, and t-butyldimethylsilanol, a silazane-based compound such as 1,2-diethyldisilazane, 1,1,2,2-tetramethyldisilazane, 1,1,3,3-tetramethyldisilazane, 1,1,1,2,2,2-hexamethyldisilazane (HMDS), 1,1,2,2-tetraethyldisilazane, and 1,2-diisopropyldisilazane, or a combination thereof, but are not limited thereto. As an example, the surface modifier may be trimethylethoxysilane (TMES).

The surface modifier may be used in a solution phase diluted in an organic solvent. Here, the organic solvent may be an alcohol (an organic solvent), and at this time, the surface modifier may be diluted to 1 vol % to 15 vol % based on the total volume of the diluted solution.

In addition, the surface modification solution may be added in an amount of 10 vol % to 130 vol %, 10 vol % to 90 vol %, 30 vol % to 90 vol %, or 50 vol % to 90 vol % with respect to the wet gel composite for a sufficient surface modification effect, but is not limited thereto.

The surface modification step may be performed at a temperature of 50° C. to 90° C. or 50° C. to 80° C. for 1 hour to 24 hours, or 6 hours to 24 hours, but is not limited thereto.

Drying Step

In the present disclosure, a step of drying the surface-modified wet gel composite to obtain an aerogel composite may be included.

The drying is performed as a process of removing only the solvent while maintaining the pore structure of the aged gel, and may be performed, for example, by supercritical drying or normal-pressure drying.

The supercritical drying process is performed using supercritical carbon dioxide, and for example, may be performed by placing the aged wet gel composite in a supercritical drying reactor, filling the reactor with $CO_2$ in a liquid state, performing a solvent replacement process of replacing an alcohol solvent inside the wet gel with $CO_2$, followed by raising the temperature to a temperature of 40° C. to 70° C. at a predetermined temperature increase rate, for example, a rate of 0.1° C./min to 1° C./min, and then maintaining a pressure equal to or higher than the pressure at which carbon dioxide becomes supercritical, for example, a pressure of 100 bar to 150 bar, thereby maintaining the supercritical state of carbon dioxide for a predetermined period of time, specifically, 20 minutes to 1 hour. In general, carbon dioxide becomes supercritical at a temperature of 31° C., and a pressure of 73.8 bar. After the predetermined temperature and the predetermined pressure at which carbon dioxide becomes supercritical are maintained for 2 hours to 12 hours, more specifically, 2 hours to 6 hours, the pressure is gradually removed to complete the supercritical drying process, thereby preparing an aerogel composite, but the present disclosure is not limited thereto.

In addition, the normal-pressure drying process may be performed according to a typical method such as hot air drying or IR drying at a temperature of 70° C. to 200° C. and under a normal pressure (1±0.3 atm) for 30 minutes to 4 hours, but is not limited thereto.

The aerogel composite dried by supercritical drying or normal-pressure drying as described above may be heat-treated at a temperature of 350° C. to 500° C. for a short time of 10 seconds to 5 minutes, 10 seconds to 3 minutes, 10 seconds to 1 minute, or 30 seconds to 1 minute to lower the carbon content on the surface of the aerogel composite. However, if the heat-treatment time is less than 10 seconds, the carbon content on the surface may not be lowered to a desired level, so that a bad odor may still be generated during exposure to a high-temperature environment. If the heat-treatment time is greater than 5 minutes, a hydrophobic group inside the aerogel matrix is also removed, thereby degrading the hydrophobicity of the aerogel composite, so that heat insulation may be degraded due to moisture absorption in the air.

The aerogel composite provided in the present disclosure may be usefully used as a heat insulation material, thermal insulation material, or non-combustible material for aircraft, ships, automobiles, electronic devices, and batteries, as well as for plant facilities for heat and cold insulation, such as piping or industrial furnaces of various industrial facilities.

Another aspect of the present disclosure relates to a heat insulation member including the aerogel composite provided in the present disclosure.

The heat insulation member may include the aerogel composite as described above, and a support member positioned on at least one surface of an upper surface of the aerogel composite and a lower surface thereof.

The support member may be, for example, a film-like support member, a sheet-like support member, a foil-like support member, a porous support member, and the like.

The film-like support member is formed by molding a polymer raw material into a thin film, and examples thereof may include an organic film of such as PET and polyimide, a glass film, and the like (including a metal-deposited film).

The sheet-like support member is formed by molding an organic, inorganic, or metallic fibrous raw material, and examples thereof may include paper, a non-woven fabric (including a glass mat), an organic fiber fabric, glass cloth, and the like.

The foil-like support member is formed by molding a metal raw material into a thin film, and examples thereof may include an aluminum foil, a copper foil, and the like.

The porous support member has a porous structure made of an organic, inorganic, or metal raw material, and examples thereof may include a porous organic material (e.g., polyurethane foam), a porous inorganic material (e.g., a zeolite sheet), a porous metal material (e.g., a porous metal sheet, a porous aluminum sheet), and the like.

The thickness of the support member is not particularly limited, and may be, for example, 0.1 μm to 100 μm, or 1 μm to 50 μm.

The heat insulation member may also be applied to applications such as a heat insulation material, thermal insulation material, or non-combustible material in the construction field, aviation field, automobile field, batteries, home appliances, semiconductor field, industrial facilities, and the like.

Hereinafter, aspects of the present disclosure will be described in detail with reference to the following examples. However, the following examples are illustrative aspects of the present disclosure, and the contents of the present disclosure are not limited by the following examples.

EXAMPLES

[Example 1] Preparation of Aerogel Composite

Methyltriethoxysilane (MTES) and tetraethyl orthosilicate (TEOS) were mixed in a molar ratio of 1:9 to prepare a silica precursor composition. The silica precursor composition and water were mixed at a molar ratio of 1:5, and the silica precursor composition and ethanol were mixed at a weight ratio of 1:3 to prepare a silica sol. In order to facilitate hydrolysis, hydrochloric acid was added such that the pH of the silica sol was to be 3 or less and then the mixture was stirred for 6 hours or more. A base catalyst solution (5 wt % of NaOH aqueous solution) having a volume ratio of 99:1 with respect to the silica sol was added to prepare a catalyzed sol. After filling the catalyzed sol in an impregnation tank, a fiber (a glass fiber mat, 3 mm) as a substrate was passed therethrough to infiltrate the catalyzed sol into the fiber, wherein the catalyzed silica sol was impregnated into the fiber mat at a volume ratio of 1:1 (catalyzed silica sol:fiber). The fiber which passed through the impregnation tank to allow the catalyzed sol to infiltrate thereinto was gelled while moving on a conveyor belt at a predetermined rate. At this time, the ambient atmosphere temperature at the top of the conveyor belt was maintained at 25° C. After the gelation was completed, stabilization was performed at room temperature (25° C.) for 10 minutes, and then primary aging was performed in an oven at 70° C. for 30 minutes. Thereafter, the wet gel composite which has gelled was added with 109 vol % of a solution, which was prepared by diluting 2.9 wt % of methyltriethoxysilane (MTES) in ethanol with a water content of 10 wt %, based on the volume of the wet gel composite, and then was subjected to secondary aging in an oven at 75° C. for 2 hours. The wet gel composite was added with 90 vol % of a solution (10 vol %) as a surface modifier, which was prepared by diluting trimethylethoxysilane (TMES) in ethanol, based on the volume of the wet gel composite, and then was subjected to surface modification at a temperature of 75° C. for 12 hours. The silica wet gel was placed in a 7.2 L supercritical extractor and $CO_2$ was injected thereto. Thereafter, the temperature inside the extractor was raised to 70° C. over the course of 1 hour and 20 minutes, and when 70° C. and 150 bar were reached, a cycle of injecting and discharging $CO_2$ at a rate of 0.5 L/min for 20 minutes and keeping the $CO_2$ injection stopped for 20 minutes was repeated for 4 times. At the time of injecting and discharging $CO_2$, the ethanol was recovered through a lower end of the extractor. Thereafter, $CO_2$ was vented over the course of 2 hours. The dried hydrophobic silica aerogel composite was heat-treated in an electric furnace at 500° C. for 30 seconds in a general air atmosphere.

[Example 2] Preparation of Aerogel Composite

Methyltriethoxysilane (MTES) and tetraethyl orthosilicate (TEOS) were mixed in a molar ratio of 1:9 to prepare a silica precursor composition. The silica precursor composition and water were mixed at a molar ratio of 1:5, and the silica precursor composition and ethanol were mixed at a weight ratio of 1:2 to prepare a silica sol. In order to facilitate hydrolysis, hydrochloric acid was added such that the pH of the silica sol was to be 3 or less and then the mixture was stirred for 6 hours or more. A base catalyst solution (5 wt % of NaOH aqueous solution) having a volume ratio of 99:1 with respect to the silica sol was added to prepare a catalyzed sol. After filling the catalyzed sol in an impregnation tank, a fiber (a glass fiber mat, 3 mm) as a substrate was passed therethrough to infiltrate the catalyzed sol into the fiber, wherein the catalyzed silica sol was impregnated into the fiber mat at a volume ratio of 1:1 (catalyzed silica sol:fiber). The fiber which passed through the impregnation tank to allow the catalyzed sol to infiltrate thereinto was gelled while moving on a conveyor belt at a predetermined rate. At this time, the ambient atmosphere temperature at the top of the conveyor belt was maintained at 25° C. After the gelation was completed, stabilization was performed at room temperature (25° C.) for 10 minutes, and then primary aging was performed in an oven at 70° C. for 30 minutes. Thereafter, the wet gel composite which has gelled was added with 109 vol % of a prepared tetraethylorthosilicate (TEOS) solution (solvent:ethanol) of 3.4 wt %, based on the volume of the wet gel composite and was subjected to secondary aging in an oven at 75° C. for 2 hour. The wet gel composite was added with 90 vol % of a solution (10 vol %) as a surface modifier, which was prepared by diluting trimethylethoxysilane (TMES) in ethanol, based on the volume of the wet gel composite, and then was subjected to surface modification at a temperature of 75° C. for 12 hours. The silica wet gel was placed in a 7.2 L supercritical extractor and $CO_2$ was injected thereto. Thereafter, the temperature inside the extractor was raised to 70° C. over the course of 1 hour and 20 minutes, and when 70° C. and 150 bar were reached, a cycle of injecting and discharging $CO_2$ at a rate of 0.5 L/min for 20 minutes and keeping the $CO_2$ injection stopped for 20 minutes was repeated for 4 times. At the time of injecting and discharging $CO_2$, the ethanol was recovered through a lower end of the extractor. Thereafter, $CO_2$ was vented over the course of 2 hours. The dried hydrophobic silica aerogel composite was heat-treated in an electric furnace at 350° C. for 30 seconds in a general air atmosphere.

[Example 3] Preparation of Aerogel Composite

Methyltriethoxysilane (MTES) and tetraethyl orthosilicate (TEOS) were mixed in a molar ratio of 2:8 to prepare a silica precursor composition. The silica precursor composition and water were mixed at a molar ratio of 1:5, and the silica precursor composition and ethanol were mixed at a weight ratio of 1:2 to prepare a silica sol. In order to facilitate hydrolysis, hydrochloric acid was added such that the pH of the silica sol was to be 3 or less and then the mixture was stirred for 6 hours or more. A base catalyst solution (5 wt % of NaOH aqueous solution) having a volume ratio of 99:1 with respect to the silica sol was added to prepare a catalyzed sol. After filling the catalyzed sol in an impregnation tank, a fiber (a glass fiber mat, 3 mm) as a substrate was passed therethrough to infiltrate the catalyzed sol into the fiber, wherein the catalyzed silica sol was impregnated into the fiber mat at a volume ratio of 1:1 (catalyzed silica sol:fiber). The fiber which passed through the impregnation tank to allow the catalyzed sol to infiltrate thereinto was gelled while moving on a conveyor belt at a predetermined rate. At this time, the ambient atmosphere temperature at the top of the conveyor belt was maintained at 25° C. The wet gel composite which has gelled was added with 109 vol % of a solution as an aging solution, which was prepared by diluting 2.4 wt % of ammonium hydroxide ($NH_4OH$) in ethanol with a water content of 10 wt %, based on the volume of the wet gel composite, and was aged for 1 hour at a temperature of 75° C. The wet gel composite was added with 90 vol % of a solution (10 vol %) as a surface modifier, which was prepared by diluting trimethylethoxysilane (TMES) in ethanol, based on the volume of the wet gel composite, and then was subjected to surface modification at a temperature of 75° C. for 12 hours. The silica wet gel was placed in a 7.2 L supercritical extractor and $CO_2$ was injected thereto. Thereafter, the temperature inside the extractor was raised to 70° C. over the course of 1 hour and 20 minutes, and when 70° C. and 150 bar were reached, a cycle of injecting and discharging $CO_2$ at a rate of 0.5 L/min for 20 minutes and keeping the $CO_2$ injection stopped for 20 minutes was repeated for 4 times. At the time of injecting and discharging $CO_2$, the ethanol was recovered through a lower end of the extractor. Thereafter, $CO_2$ was vented over the course of 2 hours. The dried hydrophobic silica aerogel composite was heat-treated in an electric furnace at 500° C. for 1 minute in a general air atmosphere.

[Example 4] Preparation of Aerogel Composite

Tetraethyl orthosilicate (TEOS) and water were mixed in a molar ratio of 1:4 and ethanol having a weight ratio of 1:1 with respect to the TEOS was added thereto to prepare a silica precursor solution. In order to promote hydrolysis of the silica precursor solution, an acid was added such that the pH of the silica precursor solution was to be 3 or less and then stirred for 2 hours or more to prepare a hydrated TEOS solution. Ethanol having a weight ratio of 1:0.73 with respect to the hydrated TEOS solution was added to prepare a silica sol. In order to facilitate hydrolysis, hydrochloric acid was added such that the pH of the silica sol was to be 3 or less and then the mixture was stirred for 6 hours or more. A base catalyst solution (5 wt % of NaOH aqueous solution) having a volume ratio of 99:1 with respect to the silica sol was added to prepare a catalyzed sol. After filling the catalyzed sol in an impregnation tank, a fiber (a glass fiber mat, 3 mm) as a substrate was passed therethrough to infiltrate the catalyzed sol into the fiber, wherein the catalyzed silica sol was impregnated into the fiber mat at a volume ratio of 1:1 (catalyzed silica sol:fiber). The fiber which passed through the impregnation tank to allow the catalyzed sol to infiltrate thereinto was gelled while moving on a conveyor belt at a predetermined rate. At this time, the ambient atmosphere temperature at the top of the conveyor belt was maintained at 25° C. After the gelation was completed, stabilization was performed at room temperature (25° C.) for 10 minutes, and then primary aging was performed in an oven at 70° C. for 30 minutes. Thereafter, the wet gel composite which has gelled was added with 109 vol % of a solution, which was prepared by diluting 4.5 wt % of methyltriethoxysilane (MTES) in ethanol with a water content of 10 wt %, based on the volume of the wet gel composite, and then was subjected to secondary aging in an oven at 75° C. for 2 hours. The wet gel composite was added with 90 vol % of a solution (10 vol %) as a surface modifier, which was prepared by diluting trimethylethoxysilane (TMES) in ethanol, based on the volume of the wet gel composite, and then was subjected to surface modification at a temperature of 75° C. for 12 hours. The silica wet gel was placed in a 7.2 L supercritical extractor and $CO_2$ was injected thereto. Thereafter, the temperature inside the extractor was raised to 70° C. over the course of 1 hour and 20 minutes, and when 70° C. and 150 bar were reached, a cycle of injecting and discharging $CO_2$ at a rate of 0.5 L/min for 20 minutes and keeping the $CO_2$ injection stopped for 20 minutes was repeated for 4 times. At the time of injecting and discharging $CO_2$, the ethanol was recovered through a lower end of the extractor. Thereafter, $CO_2$ was vented over the course of 2 hours. The dried hydrophobic silica aerogel composite was heat-treated in an electric furnace at 400° C. for 1 minute in a general air atmosphere.

[Example 5] Preparation of Aerogel Composite

Tetraethyl orthosilicate (TEOS) and water were mixed in a molar ratio of 1:4 and ethanol having a weight ratio of 1:1 with respect to the TEOS was added thereto to prepare a silica precursor solution. In order to promote hydrolysis of the silica precursor solution, an acid was added such that the pH of the silica precursor solution was to be 3 or less and then stirred for 2 hours or more to prepare a hydrated TEOS solution. Ethanol having a weight ratio of 1:1 with respect to the hydrated TEOS solution was added to prepare a silica sol. In order to facilitate hydrolysis, hydrochloric acid was added such that the pH of the silica sol was to be 3 or less and then the mixture was stirred for 6 hours or more. A base catalyst solution (5 wt % of NaOH aqueous solution) having a volume ratio of 99:1 with respect to the silica sol was added to prepare a catalyzed sol. After filling the catalyzed sol in an impregnation tank, a fiber (a glass fiber mat, 3 mm) as a substrate was passed therethrough to infiltrate the catalyzed sol into the fiber, wherein the catalyzed silica sol was impregnated into the fiber mat at a volume ratio of 1:1 (catalyzed silica sol:fiber). The fiber which passed through the impregnation tank to allow the catalyzed sol to infiltrate thereinto was gelled while moving on a conveyor belt at a predetermined rate. At this time, the ambient atmosphere temperature at the top of the conveyor belt was maintained at 25° C. After the gelation was completed, stabilization was performed at room temperature (25° C.) for 10 minutes, and then primary aging was performed in an oven at 70° C. for 30 minutes. Thereafter, the wet gel composite which has gelled was added with 109 vol % of a solution, which was prepared by diluting 2.9 wt % of methyltriethoxysilane (MTES) in ethanol with a water content of 10 wt %, based on the volume of the wet gel composite, and then was subjected to secondary aging in an oven at 75° C. for 2 hours. The wet gel composite was added with 90 vol % of a solution (10 vol %) as a surface modifier, which was prepared by diluting trimethylethoxysilane (TMES) in ethanol, based on the volume of the wet gel composite, and then was subjected to surface modification at a temperature of 75° C. for 12 hours. The silica wet gel was placed in a 7.2 L supercritical extractor and $CO_2$ was injected thereto. Thereafter, the temperature inside the extractor was raised to 70° C. over the course of 1 hour and 20 minutes, and when 70° C. and 150 bar were reached, a cycle of injecting and discharging $CO_2$ at a rate of 0.5 L/min for 20 minutes and keeping the $CO_2$ injection stopped for 20 minutes was repeated for 4 times. At the time of injecting and discharging $CO_2$, the ethanol was recovered through a lower end of the extractor. Thereafter, $CO_2$ was vented over the course of 2 hours. The dried hydrophobic silica aerogel composite was heat-treated in an electric furnace at 400° C. for 30 seconds in a general air atmosphere.

[Comparative Example 1] Preparation of Aerogel Composite

Methyltriethoxysilane (MTES) and tetraethyl orthosilicate (TEOS) were mixed in a molar ratio of 1:1 to prepare a silica precursor composition. The silica precursor composition and water were mixed at a molar ratio of 1:5, and the silica precursor composition and ethanol were mixed at a weight ratio of 1:2 to prepare a silica sol. In order to facilitate hydrolysis, hydrochloric acid was added such that the pH of the silica sol was to be 3 or less and then the mixture was stirred for 6 hours or more. A base catalyst solution (5 wt % of NaOH aqueous solution) having a volume ratio of 99:1 with respect to the silica sol was added to prepare a catalyzed sol. After filling the catalyzed sol in an impregnation tank, a fiber (a glass fiber mat, 3 mm) as a substrate was passed therethrough to infiltrate the catalyzed sol into the fiber, wherein the catalyzed silica sol was impregnated into the fiber mat at a volume ratio of 1:1 (catalyzed silica sol:fiber). The fiber which passed through the impregnation tank to allow the catalyzed sol to infiltrate thereinto was gelled while moving on a conveyor belt at a predetermined rate. At this time, the ambient atmosphere temperature at the top of the conveyor belt was maintained at 25° C. The wet gel composite which has gelled was added with 109 vol % of a solution as an aging solution, which was prepared by diluting 2.4 wt % of ammonium hydroxide ($NH_4OH$) in ethanol with a water content of 10 wt %, based on the volume of the wet gel composite, and was aged for 1 hour at a temperature of 75° C. The wet gel composite was added with 90 vol % of a solution (10 vol %) as a surface modifier, which was prepared by diluting trimethylethoxysilane (TMES) in ethanol, based on the volume of the wet gel composite, and then was subjected to surface modification at a temperature of 75° C. for 12 hours. The silica wet gel was placed in a 7.2 L supercritical extractor and $CO_2$ was injected thereto. Thereafter, the temperature inside the extractor was raised to 70° C. over the course of 1 hour and 20 minutes, and when 70° C. and 150 bar were reached, a cycle of injecting and discharging $CO_2$ at a rate of 0.5 L/min for 20 minutes and keeping the $CO_2$ injection stopped for 20 minutes was repeated for 4 times. At the time of injecting and discharging $CO_2$, the ethanol was recovered through a lower end of the extractor. Thereafter, $CO_2$ was vented over the course of 2 hours. The dried hydrophobic silica aerogel composite was heat-treated in an electric furnace at 500° C. for 10 minutes in a general air atmosphere.

[Comparative Example 2] Preparation of Aerogel Composite

Methyltriethoxysilane (MTES) and tetraethyl orthosilicate (TEOS) were mixed in a molar ratio of 1:9 to prepare a silica precursor composition. The silica precursor composition and water were mixed at a molar ratio of 1:5, and the silica precursor composition and ethanol were mixed at a weight ratio of 1:2 to prepare a silica sol. In order to facilitate hydrolysis, hydrochloric acid was added such that the pH of the silica sol was to be 3 or less and then the mixture was stirred for 6 hours or more. A base catalyst solution (5 wt % of NaOH aqueous solution) having a volume ratio of 99:1 with respect to the silica sol was added to prepare a catalyzed sol. After filling the catalyzed sol in an impregnation tank, a fiber (a glass fiber mat, 3 mm) as a substrate was passed therethrough to infiltrate the catalyzed sol into the fiber, wherein the catalyzed silica sol was impregnated into the fiber mat at a volume ratio of 1:1 (catalyzed silica sol:fiber). The fiber which passed through the impregnation tank to allow the catalyzed sol to infiltrate thereinto was gelled while moving on a conveyor belt at a predetermined rate. At this time, the ambient atmosphere temperature at the top of the conveyor belt was maintained at 25° C. The wet gel composite which has gelled was added with 109 vol % of a solution as an aging solution, which was prepared by diluting 4.5 wt % of methyltriethoxysilane (MTES) in ethanol with a water content of 10 wt %, based on the volume of the wet gel composite, and was aged for 1 hour at a temperature of 75° C. The wet gel composite was added with 90 vol % of a solution (10 vol %) as a surface modifier, which was prepared by diluting trimethylethoxysilane (TMES) in ethanol, based on the volume of the wet gel composite, and then was subjected to surface modification at a temperature of 75° C. for 12 hours. The silica wet gel was placed in a 7.2 L supercritical extractor and $CO_2$ was injected thereto. Thereafter, the temperature inside the extractor was raised to 70° C. over the course of 1 hour and 20 minutes, and when 70° C. and 150 bar were reached, a cycle of injecting and discharging $CO_2$ at a rate of 0.5 L/min for 20 minutes and keeping the $CO_2$ injection stopped for 20 minutes was repeated for 4 times. At the time of injecting and discharging $CO_2$, the ethanol was recovered through a lower end of the extractor. Thereafter, $CO_2$ was vented over the course of 2 hours. The dried hydrophobic silica aerogel composite was heat-treated in an electric furnace at 450° C. for 30 minutes in a general air atmosphere.

[Comparative Example 3] Preparation of Aerogel Composite

Tetraethyl orthosilicate (TEOS) and water were mixed in a molar ratio of 1:4 and ethanol having a weight ratio of 1:1 with respect to the TEOS was added thereto to prepare a silica precursor solution. In order to promote hydrolysis of the silica precursor solution, an acid was added such that the pH of the silica precursor solution was to be 3 or less and then stirred for 2 hours or more to prepare a hydrated TEOS solution. Ethanol having a weight ratio of 1:0.73 with respect to the hydrated TEOS solution was added to prepare a silica sol. In order to facilitate hydrolysis, hydrochloric acid was added such that the pH of the silica sol was to be 3 or less and then the mixture was stirred for 6 hours or more. A base catalyst solution (5 wt % of NaOH aqueous solution) having a volume ratio of 99:1 with respect to the silica sol was added to prepare a catalyzed sol. After filling the catalyzed sol in an impregnation tank, a fiber (a glass fiber fiber mat, 3 mm) as a substrate was passed therethrough to infiltrate the catalyzed sol into the fiber, wherein the catalyzed silica sol was impregnated into the fiber mat at a volume ratio of 1:1 (catalyzed silica sol:fiber). The fiber which passed through the impregnation tank to allow the catalyzed sol to infiltrate thereinto was gelled while moving on a conveyor belt at a predetermined rate. At this time, the ambient atmosphere temperature at the top of the conveyor belt was maintained at 25° C. The wet gel composite which has gelled was added with 109 vol % of a solution as an aging solution, which was prepared by diluting 2.4 wt % of ammonium hydroxide ($NH_4OH$) in ethanol with a water content of 10 wt %, based on the volume of the wet gel composite, and was aged for 1 hour at a temperature of 75° C. The wet gel composite was added with 90 vol % of a solution (10 vol %) as a surface modifier, which was prepared by diluting trimethylethoxysilane (TMES) in ethanol, based on the volume of the wet gel composite, and then was subjected to surface modification at a temperature of 75° C. for 12 hours. The silica wet gel was placed in a 7.2 L supercritical extractor and $CO_2$ was injected thereto. Thereafter, the temperature inside the extractor was raised to 70° C. over the course of 1 hour and 20 minutes, and when 70° C. and 150 bar were reached, a cycle of injecting and discharging $CO_2$ at a rate of 0.5 L/min for 20 minutes and keeping the $CO_2$ injection stopped for 20 minutes was repeated for 4 times. At the time of injecting and discharging $CO_2$, the ethanol was recovered through a lower end of the extractor. Thereafter, $CO_2$ was vented over the course of 2 hours. The dried hydrophobic silica aerogel composite was heat-treated in an electric furnace at 500° C. for 5 seconds in a general air atmosphere.

[Comparative Example 4] Preparation of Aerogel Composite

Methyltriethoxysilane (MTES) and tetraethyl orthosilicate (TEOS) were mixed in a molar ratio of 1:9 to prepare a silica precursor composition. The silica precursor composition and water were mixed at a molar ratio of 1:5, and the silica precursor composition and ethanol were mixed at a weight ratio of 1:3 to prepare a silica sol. In order to facilitate hydrolysis, hydrochloric acid was added such that the pH of the silica sol was to be 3 or less and then the mixture was stirred for 6 hours or more. A base catalyst solution (5 wt % of NaOH aqueous solution) having a volume ratio of 99:1 with respect to the silica sol was added to prepare a catalyzed sol. After filling the catalyzed sol in an impregnation tank, a fiber (a glass fiber mat, 3 mm) as a substrate was passed therethrough to infiltrate the catalyzed sol into the fiber, wherein the catalyzed silica sol was impregnated into the fiber mat at a volume ratio of 1:1 (catalyzed silica sol:fiber). The fiber which passed through the impregnation tank to allow the catalyzed sol to infiltrate thereinto was gelled while moving on a conveyor belt at a predetermined rate. At this time, the ambient atmosphere temperature at the top of the conveyor belt was maintained at 25° C. The wet gel composite which has gelled was added with 90 vol % of a solution (10 vol %) as a surface modifier, which was prepared by diluting trimethylethoxysilane (TMES) in ethanol, based on the volume of the wet gel composite, and then was subjected to surface modification at a temperature of 75° C. for 12 hours. The silica wet gel was placed in a 7.2 L supercritical extractor and $CO_2$ was injected thereto. Thereafter, the temperature inside the extractor was raised to 70° C. over the course of 1 hour and 20 minutes, and when 70° C. and 150 bar were reached, a cycle of injecting and discharging $CO_2$ at a rate of 0.5 L/min for 20 minutes and keeping the $CO_2$ injection stopped for 20 minutes was repeated for 4 times. At the time of injecting and discharging $CO_2$, the ethanol was recovered through a lower end of the extractor. Thereafter, $CO_2$ was vented over the course of 2 hours to prepare a hydrophobic silica aerogel composite.

[Comparative Example 5] Preparation of Aerogel Composite

Tetraethyl orthosilicate (TEOS) and water were mixed in a molar ratio of 1:4 and ethanol having a weight ratio of 1:1 with respect to the TEOS was added thereto to prepare a silica precursor solution. In order to promote hydrolysis of the silica precursor solution, an acid was added such that the pH of the silica precursor solution was to be 3 or less and then stirred for 2 hours or more to prepare a hydrated TEOS solution. Ethanol having a weight ratio of 1:0.73 with respect to the hydrated TEOS solution was added to prepare a silica sol. In order to facilitate hydrolysis, hydrochloric acid was added such that the pH of the silica sol was to be 3 or less and then the mixture was stirred for 6 hours or more. A base catalyst solution (5 wt % of NaOH aqueous solution) having a volume ratio of 99:1 with respect to the silica sol was added to prepare a catalyzed sol. After filling the catalyzed sol in an impregnation tank, a fiber (a glass fiber mat, 3 mm) as a substrate was passed therethrough to infiltrate the catalyzed sol into the fiber, wherein the catalyzed silica sol was impregnated into the fiber mat at a volume ratio of 1:1 (catalyzed silica sol:fiber). The fiber which passed through the impregnation tank to allow the catalyzed sol to infiltrate thereinto was gelled while moving on a conveyor belt at a predetermined rate. At this time, the ambient atmosphere temperature at the top of the conveyor belt was maintained at 25° C. The wet gel composite which has gelled was added with 109 vol % of a solution as an aging solution, which was prepared by diluting 2.9 wt % of methyltriethoxysilane (MTES) in ethanol with a water content of 10 wt %, based on the volume of the wet gel composite, and was aged for 1 hour at a temperature of 75° C. The wet gel composite was added with 90 vol % of a solution (10 vol %) as a surface modifier, which was prepared by diluting trimethylethoxysilane (TMES) in ethanol, based on the volume of the wet gel composite, and then was subjected to surface modification at a temperature of 75° C. for 12 hours. The silica wet gel was placed in a 7.2 L supercritical extractor and $CO_2$ was injected thereto.

Thereafter, the temperature inside the extractor was raised to 70° C. over the course of 1 hour and 20 minutes, and when 70° C. and 150 bar were reached, a cycle of injecting and discharging $CO_2$ at a rate of 0.5 L/min for 20 minutes and keeping the $CO_2$ injection stopped for 20 minutes was repeated for 4 times. At the time of injecting and discharging $CO_2$, the ethanol was recovered through a lower end of the extractor. Thereafter, $CO_2$ was vented over the course of 2 hours. After the supercritical drying was completed, drying was additionally performed for 1 hour under the conditions of 150° C. and atmospheric pressure to prepare a hydrophobic silica aerogel composite.

[Experimental Example 1] Analysis of Component of Aerogel Composite

1. Analysis of Silicon (Si), Carbon (C), and Oxygen (O) Contents in Entire Aerogel Composite The contents of a Si element, a C element, and an O element included in each of the aerogel composites of Examples 1 to 5 and Comparative Examples 1 to 5 were analyzed by X-ray fluorescence (XRF) analysis. First, five circular samples having a diameter of approximately 30 mm were obtained from each aerogel composite of Examples and Comparative Examples. More specifically, four samples were obtained by positioning a position, which is spaced apart by 10 cm in a center direction from each corner of an aerogel composite having a size of 60 cm×12 cm, at the exact center of a sample, and one sample was obtained by positioning the exact central portion of the aerogel composite at the exact center of a sample. For the XRF analysis, a WD-XRF (Rigaku ZSX Primus IV) device was used, and the samples were placed in a dedicated holder of the corresponding device, and then the contents of the Si element, the C element, and the O element were analyzed. At this time, the content percentage (wt %) of each element was calculated by setting the total content of the Si element, the C element, and the O element to 100 wt %.

2. Analysis of Silicon (Si), Carbon (C), and Oxygen (O) Contents on Surface of Aerogel Composite The contents of the Si element, the C element, and the O element were analyzed by X-ray photoelectron spectroscopy (XPS) analysis with respect to a region with a thickness of approximately 10 nm from the surface of the aerogel composite. First, a sample used for the XRF analysis of 1 above was cut into a square sample measuring approximately 10 mm×10 mm in width×length. An X-ray photoelectron spectroscopy (Model name: Nexsa, manufacturer: Thermo Fisher Scientific Inc.) was used as an XPS analysis device, and monochromatic Al Kα (1486.6 eV) was used as an X-ray source, and quantitative analysis was performed using Shirley Peak background, ALTHERMO1 Sensitivity factor, and TPP-2M Energy compensation factor. The contents of the Si element, the C element, and the O element present on the surface of the aerogel composite were calculated by obtaining the atomic percent (at %) of each element based on the total atomic weight using Avantage software, and then calculating the wt % of each element by setting the total content of the Si element, the C element, and the O element to 100 wt %.

The contents (wt %) of the Si element, the C element, and the O element based on the total thickness of the aerogel composite which were obtained through the XRF analysis are shown in Table 1. In addition, the contents (wt %) of the Si element, the C element, and the O element on the surface of the aerogel composite which are obtained through the XPS analysis are shown in Table 2 below. Based on the results of Tables 1 and 2, the ratio of carbon content on the surface of the aerogel composite to the carbon content based on the total thickness of the aerogel composite was calculated and the results are shown in Table 3 below. However, the analysis results of Tables 1 and 2 are represented by calculating an average value from the results measured for the five samples for each aerogel composite, which is rounded from the fourth decimal place and expressed to third decimal places.

TABLE 1

XRF analysis results

| Classification | Content (wt %) | | |
| --- | --- | --- | --- |
| | O | C | Si |
| Example 1 | 53.50 | 3.97 | 42.53 |
| Example 2 | 53.66 | 4.95 | 41.39 |
| Example 3 | 59.73 | 6.76 | 33.51 |
| Example 4 | 54.79 | 6.89 | 38.32 |
| Example 5 | 69.36 | 5.00 | 25.64 |
| Comparative Example 1 | 62.88 | 3.36 | 33.76 |
| Comparative Example 2 | 56.82 | 3.44 | 39.74 |
| Comparative Example 3 | 56.33 | 4.08 | 39.59 |
| Comparative Example 4 | 54.82 | 4.26 | 40.92 |
| Comparative Example 5 | 55.19 | 4.83 | 39.98 |

TABLE 2

XPS analysis results

| Classification | Content (wt %) | | |
| --- | --- | --- | --- |
| | O | C | Si |
| Example 1 | 47.62 | 10.54 | 41.84 |
| Example 2 | 44.82 | 13.97 | 41.21 |
| Example 3 | 47.89 | 14.08 | 38.03 |
| Example 4 | 43.16 | 14.63 | 42.21 |
| Example 5 | 43.91 | 14.03 | 42.06 |
| Comparative Example 1 | 48.88 | 5.13 | 45.99 |
| Comparative Example 2 | 49.93 | 6.15 | 43.92 |
| Comparative Example 3 | 42.09 | 15.11 | 42.80 |
| Comparative Example 4 | 42.50 | 16.31 | 41.19 |
| Comparative Example 5 | 47.42 | 18.03 | 34.55 |

TABLE 3

| Classification | Surface carbon/total carbon | Surface silicon/total silicon | Surface oxygen/total oxygen |
| --- | --- | --- | --- |
| Example 1 | 2.655 | 0.984 | 0.890 |
| Example 2 | 2.822 | 0.996 | 0.835 |
| Example 3 | 2.083 | 1.135 | 0.802 |
| Example 4 | 2.123 | 1.102 | 0.788 |
| Example 5 | 2.806 | 1.640 | 0.633 |
| Comparative Example 1 | 1.527 | 1.362 | 0.777 |
| Comparative Example 2 | 1.788 | 1.105 | 0.879 |
| Comparative Example 3 | 3.703 | 1.081 | 0.747 |

TABLE 3-continued

| Classification | Surface carbon/total carbon | Surface silicon/total silicon | Surface oxygen/total oxygen |
|---|---|---|---|
| Comparative Example 4 | 3.829 | 1.007 | 0.775 |
| Comparative Example 5 | 3.733 | 0.864 | 0.859 |

As shown in Tables 1 to 3, in the aerogel composites of Examples 1 to 5, the ratio (surface carbon/total carbon) of the carbon content on the surface to the carbon content based on the total thickness of the aerogel composite was 2 to 3, whereas in the aerogel composites of Comparative Examples 1 and 2, the ratio was as low as 1.8 or less, and in the aerogel composites of Comparative Examples 3 to 5, the ratio was as high as 7 or greater.

[Experimental Example 2] Analysis of Generation Amount of Volatile Organic Compound (VOC)

In order to compare the generation amounts of the volatile organic compounds from the aerogel composites prepared in Examples 1 to 5 and in Comparative Examples 1 to 5, gas chromatography/mass spectrometry-thermal desorption (GC/MS-TD) was performed by exposure to high temperatures. The GC/MS-TD analysis conditions were as follows:
Sample: 50 mg
Temperature and time: 150° C., 15 minutes
GC oven: 40° C. (5 minutes)–temperature elevation (10° C./minute)–250° C. (10 minutes)
Column: DB-624
Toluene standard solution As shown in Equation 1 below, the release rate (μg/g) of the volatile organic compound was calculated according to Equation 2 below. The result of the gas chromatography/mass spectrometry-thermal desorption (GC/MS-TD) analysis is a value (μg/g) obtained by calculating a peak area with respect to the toluene standard solution.

$$VOC_{compound} = [(A_{compound}/A_{std}) \times C_{std}]/W_{sample} \quad \text{[Equation 2]}$$

$VOC_{compound}$: VOC value (μg/g) of individual material generated in measurement sample
$A_{compound}$: Chromatogram area of individual material peak of measurement sample
$A_{std}$: Peak area of toluene standard solution
$C_{std}$: Toluene mass (μg) injected using toluene standard solution
$W_{sample}$: Weight of measurement sample (g)

TABLE 4

| Classification | Generation amount (μg/g) | | | |
|---|---|---|---|---|
| | EtOH | TMES | TMS | HMDSO |
| Example 1 | 1460 | <10 | <10 | <10 |
| Example 2 | 1780 | <10 | <10 | <10 |
| Example 3 | 1320 | <10 | <10 | <10 |
| Example 4 | 1130 | <10 | <10 | <10 |
| Example 5 | 1410 | <10 | <10 | <10 |
| Comparative Example 1 | <10 | <10 | <10 | <10 |
| Comparative Example 2 | <10 | <10 | <10 | <10 |
| Comparative Example 3 | 2180 | 30 | 20 | 20 |
| Comparative Example 4 | 2870 | 50 | 30 | 20 |
| Comparative Example 5 | 2300 | 50 | 30 | 20 |

As shown in Table 4, in the aerogel composites prepared in Examples 1 to 5 and Comparative Examples 1 and 2 in which the ratio of the carbon content on the surface to the total carbon content was as low as 3 or less, the generation amounts of trimethylethoxysilane (TMES), trimethoxysilane (TMS), and hexamethyldisiloxane (HMDSO), which are known to generate a bad odor, all exhibited a very low level of less than 10 μg/g. However, in the aerogel composites of Comparative Examples 3 to 5 in which the ratio was greater than 3, it can be seen that trimethylethoxysilane (TMES) and trimethoxysilane (TMS) were generated in about 30 μg/g, and hexamethyldisiloxane (HMDSO) was generation in about 20 μg/g.

[Experimental Example 3] Evaluation of Hydrophobicity of Aerogel Composite

In order to evaluate the internal hydrophobicity of the aerogel composites prepared in Examples 1 to 5 and Comparative Examples 1 to 5, cross-sectional water repellency was measured according to ASTM C1511 specifications with respect to a sample having a size of 10 mm×10 mm. Specifically, for the aerogel composite of each of Examples and Comparative Examples, five samples having the above-described size were prepared in the same manner as in Experimental Example 1. The sample was floated on distilled water at 21±2° C., and then a 6.4 mm mesh screen was place on top of the sample and sunk to 127 mm below the surface of the water (impregnation). 15 minutes later, the mesh screen was removed, and when the sample rose to the surface, the sample was picked up with a clamp and was hung vertically for 60±5 seconds. Thereafter, the weight of the samples before/after the impregnation were each measured to measure the moisture impregnation rate according to Equation 1 below. The results show an average value of the moisture impregnation rates measured for the five samples, which is rounded from the second decimal place and expressed to the first decimal place.

Moisture impregnation rate (wt %)={(Weight of sample after impregnation–Weight of sample before impregnation)/(Weight of sample before impregnation)}×100    [Equation 1]

TABLE 5

| Classification | Moisture impregnation rate (wt %) |
|---|---|
| Example 1 | 6.6 |
| Example 2 | 5.0 |
| Example 3 | 11 |
| Example 4 | 6.5 |
| Example 5 | 5.4 |
| Comparative Example 1 | 153 |
| Comparative Example 2 | 93 |
| Comparative Example 3 | 4.8 |
| Comparative Example 4 | 4.1 |

TABLE 5-continued

| Classification | Moisture impregnation rate (wt %) |
|---|---|
| Comparative Example 5 | 4.5 |

As shown in Table 5 above, it can be seen that the moisture impregnation rate of the aerogel composite of each of Examples 1 to 5 is about 11 wt % or less, which indicates high internal hydrophobicity. However, it can be seen that the aerogel composites of Comparative Examples 1 and 2 respectively have very high moisture impregnation rates of 153 wt % and 93 wt %, which indicates a very low level of hydrophobicity therein.

From the above-described experimental results, it can be seen that as the aerogel composite according to the present disclosure, in an aerogel composite having a ratio of the carbon content on the surface to the total carbon content based on the thickness of 2 to 3, the carbon content on the surface is low, so that the generation of volatile organic compounds such as trimethylethoxysilane (TMES), trimethoxysilane (TMS), and hexamethyldisiloxane (HMDSO), all of which May generate a bad odor, is suppressed, but the internal hydrophobicity of the aerogel composite is maintained high, so that it is possible to suppress the problem of degradation in heat insulation due to moisture in the air during actual use.

What is claimed is:

1. An aerogel composite comprising:
   a substrate; and
   an aerogel including a plurality of open pores;
   wherein the aerogel composite includes carbon (C), silicon (Si), and oxygen (O), and wherein a ratio of a carbon content in a surface of the aerogel composite to a total carbon content of the aerogel composite is from 2 to 3 based on a total sum of carbon, silicon, and oxygen in the aerogel composite being 100 wt %.

2. The aerogel composite of claim 1, wherein the ratio of the carbon content in the surface of the aerogel composite to the total carbon content of the aerogel composite is from 2 to 2.85.

3. The aerogel composite of claim 1, wherein the surface of the aerogel composite comprises silicon in an amount from 20 wt % to 50 wt %, the surface of the aerogel composite comprises oxygen in an amount from 30 wt % to 60 wt %, and the surface of the aerogel composite comprises carbon in an amount from 5 wt % to 30 wt %, based on a total sum of carbon, silicon, and oxygen in the surface of the aerogel composite being 100 wt %.

4. The aerogel composite of claim 1, wherein the aerogel composite comprises silicon in an amount from 20 wt % to 50 wt %, the aerogel composite comprises oxygen in an amount from 40 wt % to 75 wt %, and the aerogel composite comprises carbon in an amount from 1 wt % to 20 wt %, based on the total sum of the carbon, silicon, and oxygen in the aerogel composite being 100 wt %.

5. The aerogel composite of claim 4, wherein a ratio of the total carbon content of the aerogel composite to a total silicon content of the aerogel composite is from 0.05 to 0.30.

6. The aerogel composite of claim 1, wherein a ratio of a silicon content in the surface of the aerogel composite to a total silicon content of the aerogel composite is from 0.9 to 2.0.

7. The aerogel composite of claim 1, wherein a ratio of an oxygen content in the surface of the aerogel composite to a total oxygen content of the aerogel composite is from 0.5 to 1.0.

8. The aerogel composite of claim 1, wherein when the aerogel composite is heated at a temperature of 150° C. for 15 minutes, an amount of trimethylethoxysilane (TMES), trimethylsilanol (TMS), or hexamethyldisiloxane (HMDSO) generated per unit weight of the aerogel composite is 10 μg/g or less.

9. The aerogel composite of claim 1, wherein the aerogel composite has a moisture impregnation rate (wt %) of 15 wt % or less, wherein the moisture impregnation rate is represented by Equation 1:

Moisture impregnation rate (wt %)={(Weight of sample after impregnation−Weight of sample before impregnation)/(Weight of sample before impregnation)}×100    [Equation 1]

wherein in Equation 1, the weight of the sample after impregnation is a weight measured after impregnating the sample in distilled water at 21±2° C. for 15 minutes.

10. The aerogel composite of claim 1, wherein the aerogel composite has a thickness from 0.5 mm to 20 mm.

11. The aerogel composite of claim 1, wherein the aerogel composite has a density from 0.05 g/cm$^3$ to 0.50 g/cm$^3$.

12. The aerogel composite of claim 1, wherein the aerogel comprises silica, methylsilylated silica, dimethylsilylated silica, trimethylsilylated silica, or a mixture thereof.

13. The aerogel composite of claim 1, wherein the aerogel comprises a plurality of primary aerogel particles having a particle diameter of greater than 0 nm to 5 nm, wherein the plurality of primary aerogel particles are aggregated or bonded in a plurality of secondary aerogel particles.

14. The aerogel composite of claim 1, wherein the aerogel composite has a compressive strength from 20 kPa to 80 kPa at 10% strain, and wherein the aerogel composite has a tensile strength from 30 N/cm$^2$ to 60 N/cm$^2$.

15. A heat insulation member comprising the aerogel composite of claim 1.

16. The heat insulation member of claim 15, wherein the heat insulation member further comprises a support member on an upper surface of the aerogel composite or a lower surface of the aerogel composite or both.

* * * * *